(12) United States Patent
Gesy (10) Patent No.: US 9,290,162 B1
(45) Date of Patent: Mar. 22, 2016

(54) CARWASH BRUSH CARRIAGE ASSEMBLY

(71) Applicant: Daniel L. Gesy, Denison, IA (US)

(72) Inventor: Daniel L. Gesy, Denison, IA (US)

(*) Notice: Subject to any disclaimer, the term of this patent is extended or adjusted under 35 U.S.C. 154(b) by 0 days.

(21) Appl. No.: 14/613,434

(22) Filed: Feb. 4, 2015

(51) Int. Cl.
*B60S 3/06* (2006.01)

(52) U.S. Cl.
CPC ..................... *B60S 3/066* (2013.01)

(58) Field of Classification Search
CPC ....................................... B60S 3/066
See application file for complete search history.

(56) References Cited

U.S. PATENT DOCUMENTS

| 5,325,559 | A | 7/1994 | Belanger |
| 7,337,791 | B1 | 3/2008 | Belanger |
| RE40,463 | E | 8/2008 | Belanger |
| 7,752,698 | B2 | 7/2010 | Morin |
| 8,163,096 | B2 | 4/2012 | Belanger |
| 8,627,535 | B2 | 1/2014 | Belanger |
| 2006/0157093 | A1 | 7/2006 | Belanger |

*Primary Examiner* — Shay Karls
(74) *Attorney, Agent, or Firm* — Dennis L. Thomte; Thomte Patent Law Office LLC (57) ABSTRACT

An improved carwash brush carriage is provided for use with a carwash structure which includes horizontally disposed first and second tubular support arms. The carwash brush carriage of this invention includes first, second, third and fourth double-flanged rollers of the sealed bearing type which are rotatably mounted on the support arms. A conversion kit is also described for converting an existing brush carriage.

3 Claims, 8 Drawing Sheets

CARWASH BRUSH CARRIAGE ASSEMBLY

BACKGROUND OF THE INVENTION

1. Field of the Invention

This invention relates to a carwash brush carriage assembly of a carwash apparatus and more particularly to improved double-flanged rollers for supporting the carwash brush carriage assembly on a pair of horizontally disposed and longitudinally spaced-apart support arms of the carwash apparatus. Even more particularly, this invention relates to a carwash brush carriage assembly wherein the double-flanged rollers thereof are of the sealed-type bearing rollers.

2. Description of the Related Art

A carwash brush extension arm with roller bearings is disclosed in U.S. Pat. No. 7,752,698. In the '698 patent, the brush carriage thereof is movably supported upon a pair of horizontally disposed and horizontally spaced-apart support arms which are parallel to one another. Although the invention of the '698 patent is believed to have met with some commercial success, the four roller bearings of the '698 patent, which movably support the brush carriage on a pair of horizontally disposed and horizontally spaced-apart support arms, are believed to present some problems. Since each of the roller bearings of the '698 patent include a plurality of spaced-apart roller members, the roller members are believed to fail in use since the bearing members are not sealed and are subjected to high pressure water which causes the individual roller bearings to fail after a period of time.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A carwash apparatus is shown and described which includes a horizontally disposed first tubular support arm, a horizontally disposed second tubular support arm with the first and second tubular support arms being horizontally spaced-apart and being parallel to one another. The carwash brush carriage assembly of the instant invention is horizontally movably mounted on and is supported by the first and second tubular support arms. The brush carriage assembly includes a horizontally disposed lower plate positioned below the first and second tubular support arms with the lower plate having a first end, a second end, a first side, a second side, a lower surface and an upper surface. The brush carriage assembly also includes a horizontally disposed upper plate which is positioned above the first and second tubular support arms with the upper plate having a first end, a second end, a first side, a second side, a lower surface and an upper surface. The brush carriage assembly also includes a first upstanding side plate having a lower end, an upper end, a first end, a second end, an inner side and an outer side. The first side plate has its lower end secured to the lower plate at the first side thereof and has its upper end secured to the upper plate at the first side thereof. The brush carriage assembly also includes a second upstanding side plate having a lower end, an upper end, a first end, a second end, an inner side and an outer side. The second side plate has its lower end secured to the lower plate at the second side thereof and has its upper end secured to the upper plate at the second side thereof. The brush carriage assembly also includes a first upstanding end plate, having a lower end, an upper end, a first side, a second side, an outer surface and an inner surface. The first end plate has its lower end secured to the lower plate at the first end of the lower plate and has its upper end secured to the upper plate at the first end of the upper plate. The brush carriage assembly also includes a second upstanding end plate having a lower end, an upper end, a first side, a second side, an outer surface and an inner surface. The second end plate has its lower end secured to the lower plate at the second end thereof and has its upper end secured to the upper plate at the second end thereof.

An elongated and horizontally disposed first cross-bar, having first and second ends, is secured to the upper plate at the first end of the upper plate with the longitudinal axis of the first cross-bar being transversely disposed with respect to the longitudinal axes of the first and second support arms. An elongated and horizontally disposed first axle, in the form of a bolt, having inner and outer ends, has its inner end thereof secured to the first end of the first cross-bar. A double-flanged first roller is rotatably mounted on the first axle and is configured to roll upon the second support arm. An elongated and horizontally disposed second axle, in the form of a bolt, having inner and outer ends, has its inner end thereof being secured to the second end of the first cross-bar. A double-flanged second roller is rotatably mounted on the second axle and is configured to roll upon the first support arm.

An elongated and horizontally extending second cross-bar, having first and second ends, is secured to the upper plate at the second end thereof with the longitudinal axis thereof being transversely disposed with respect to the longitudinal axes of the first and second support arms. An elongated and horizontally disposed third axle, in the form of a bolt, having inner and outer ends, has its inner end secured to the first end of the second cross-bar. A double-flanged third roller is rotatably mounted on the third axle and is configured to roll upon the second support arm. An elongated and horizontally disposed fourth axle, in the form of a bolt, having inner and outer ends, has its inner end secured to the second end of the second cross-bar. A double-flanged fourth roller is rotatably mounted on the fourth axle and is configured to roll upon the first support arm. The first, second, third and fourth double-flanged rollers are of the sealed bearing type.

An elongated and horizontally extending first support bar, having first and second ends, is secured to the upper plate at the first side thereof. The outer end of the first axle is received by the first end of the first support bar. The outer end of the third axle is received by the second end of the first support bar. An elongated and horizontally extending second support bar, having first and second ends, is secured to the upper plate at the second side thereof. The outer end of the second axle is received by the first end of the second support bar with the outer end of the fourth axle being received by the second end of the second support bar.

A principal object of the invention is to provide an improved carwash brush carriage assembly having sealed bearing type double-flanged rollers mounted thereon.

A further object of the invention is to provide an invention of the type described which enables a conventional prior art device to be easily modified to have double-flanged rollers mounted thereon.

A further object of the invention is to provide an invention of the type described which enables the rollers thereof to function for a long period of time.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
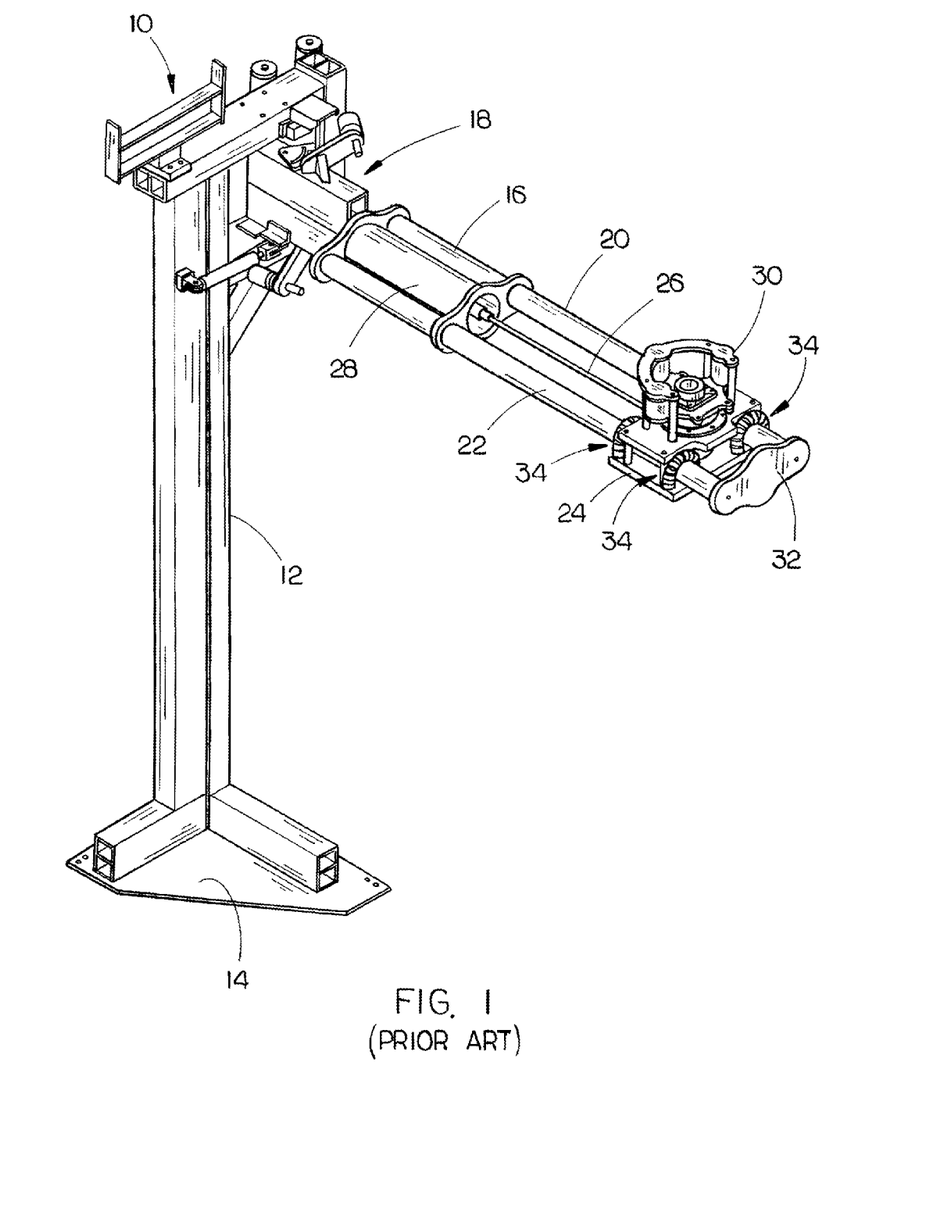
FIG. 1 is a perspective view of the carwash apparatus of U.S. Pat. No. 7,752,698.
Figure 2:
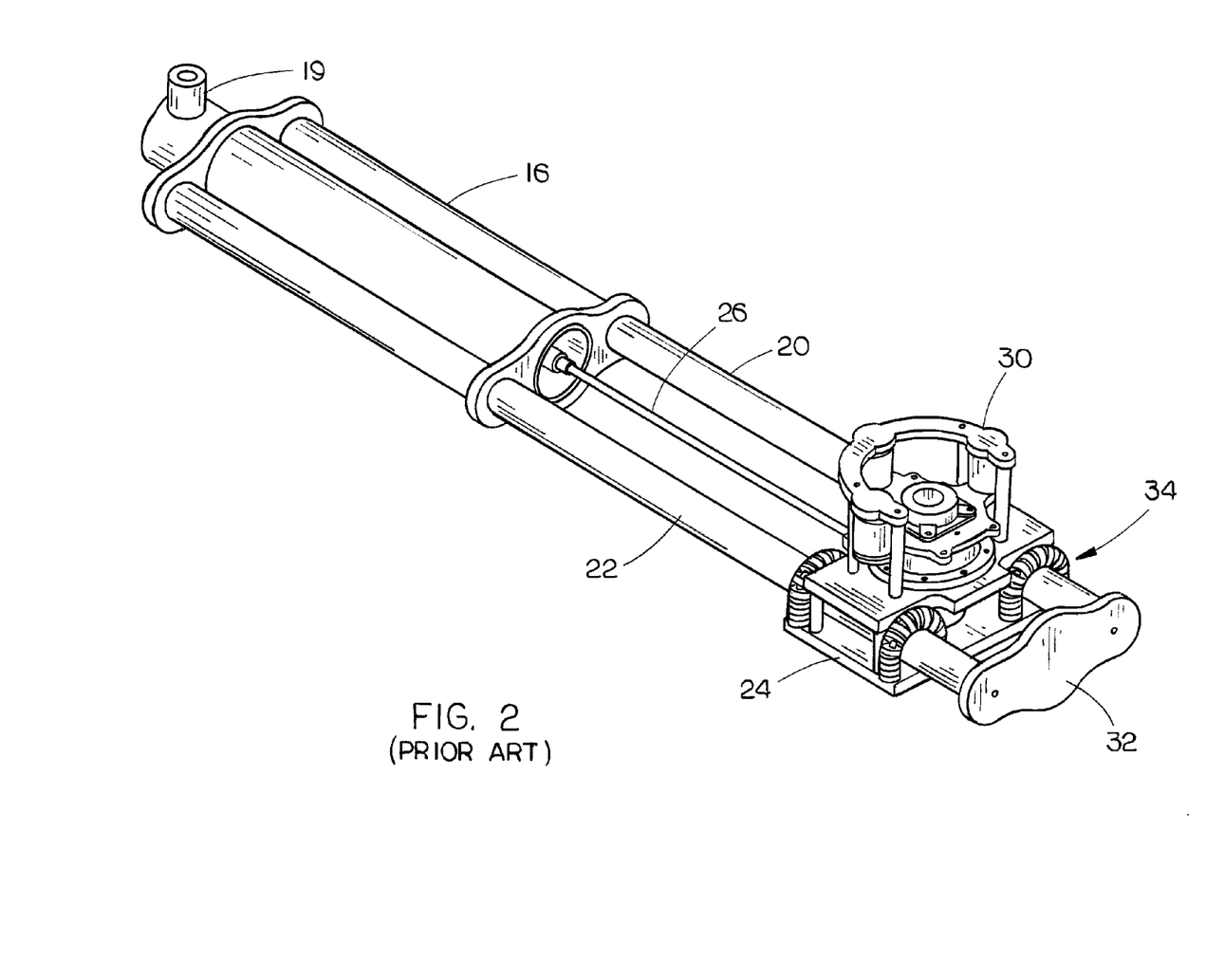
FIG. 2 is a partial perspective view of the carwash apparatus of U.S. Pat. No. 7,752,698.
Figure 3:
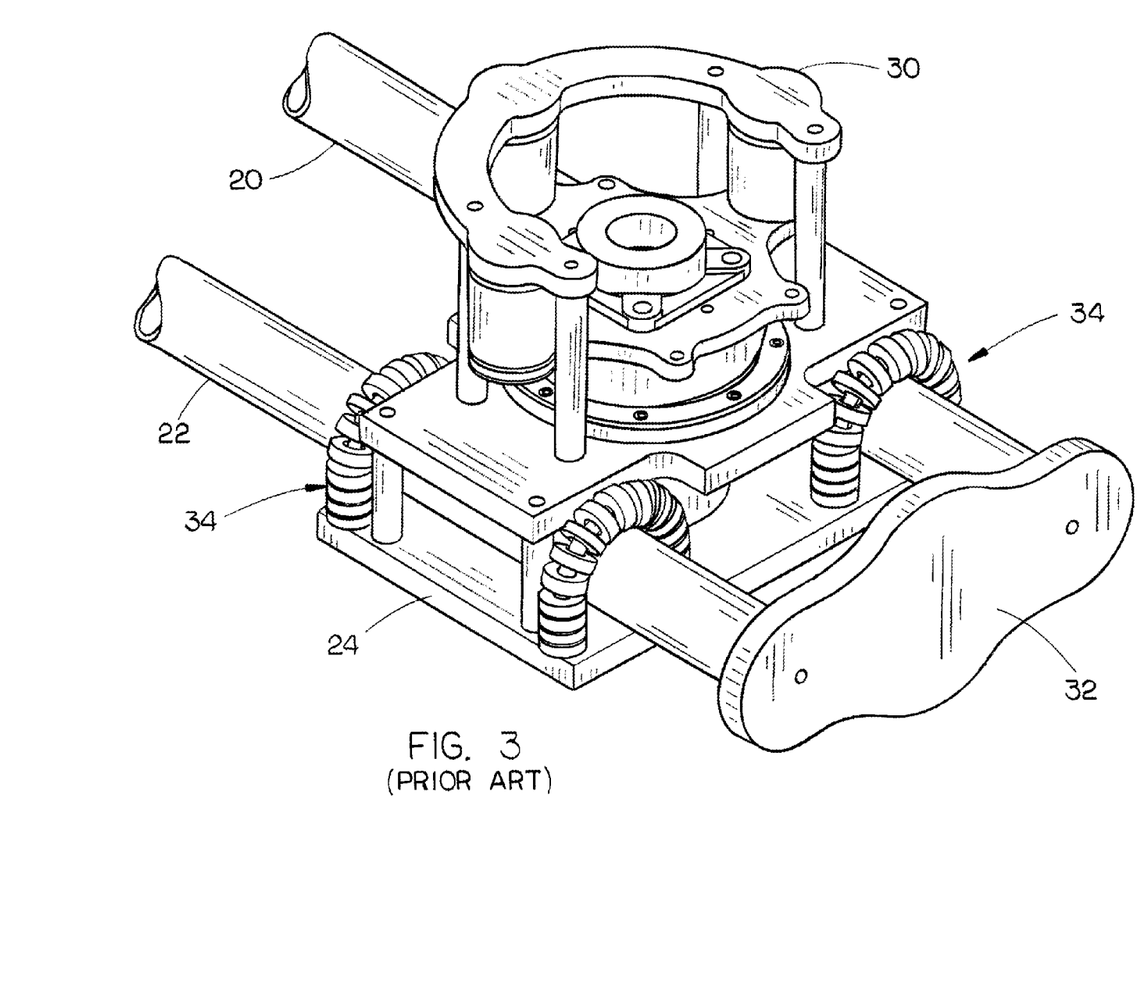
FIG. 3 is a partial perspective view of the carwash apparatus of U.S. Pat. No. 7,752,698.
Figure 4:
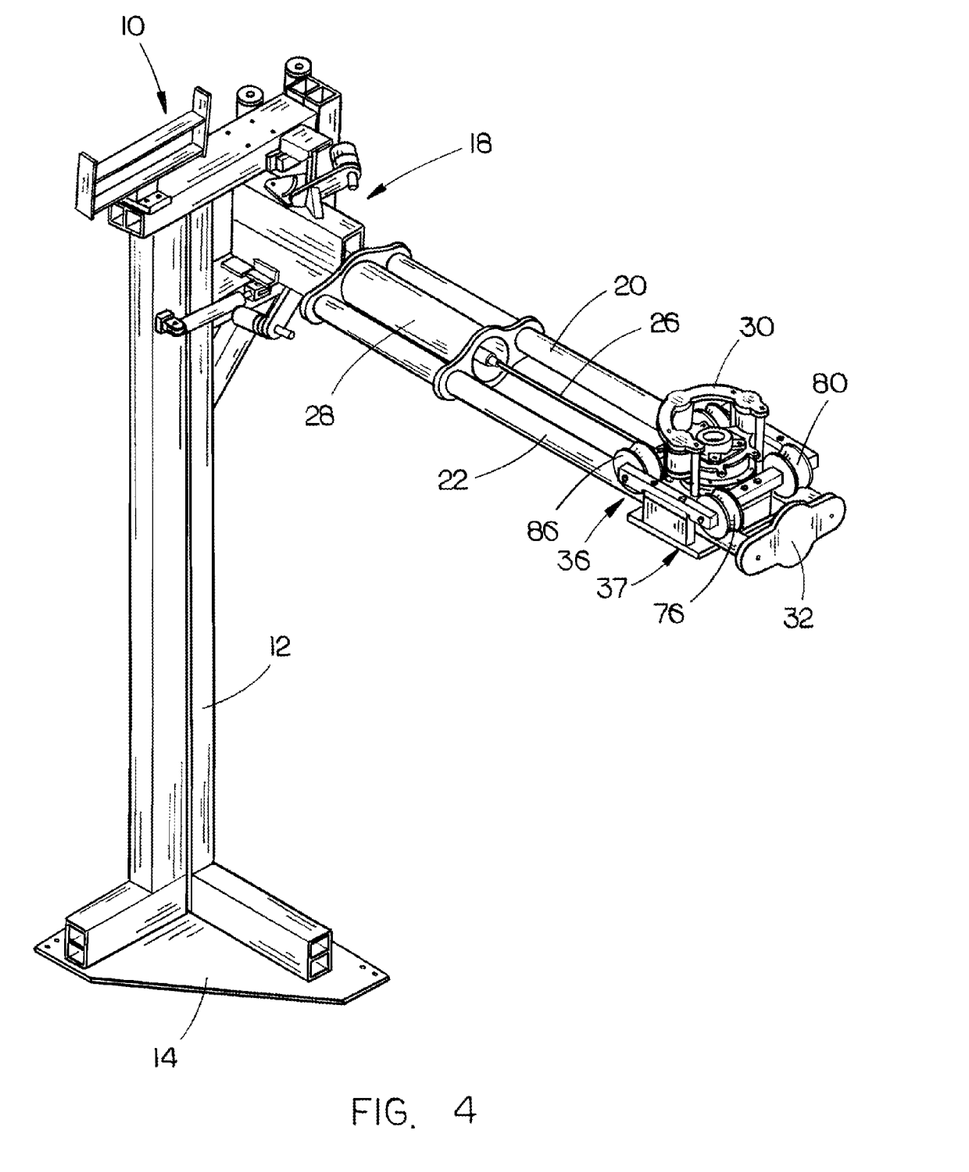
FIG. 4 is a perspective view of the carwash apparatus of U.S. Pat. No. 7,752,698 after having been modified with the instant invention.

FIGS. 1-3 illustrate a prior art carwash apparatus distributed by Belanger, Inc. of Northville, Mich. and who received U.S. Pat. No. 7,752,698. FIGS. 1-3 hereof are substantial duplicates of FIGS. 1-3 of the '698 patent. The carwash apparatus of the '698 patent will be partially described hereinbelow to provide the background of this invention which is directed to an improved brush carriage for carwash apparatuses such as shown in the '698 patent. The disclosure of the '698 patent is incorporated herein by reference thereto to complete this disclosure if necessary.

Referring now to FIGS. 1-3, there is shown a carwash brush support structure 10 comprising a vertical support beam 12 mounted on a bolt down floor plate 14. The vertical support beam 12 carries a horizontal brush support arm 16 which can be pivoted about a vertical axis by control structure 18. The extendable support arm structure 16 comprises parallel cylindrical stainless steel arms 20 and 22, and a brush carriage 24, the longitudinal position of which along the support arms 20 and 22 is controlled by a hydraulic cylinder 28 having a connector rod 26 between the cylindrical support arms 20 and 22 and the carriage 24.

The carriage 24 supports a brush motor frame 30 and various additional structural details to receive a carwash brush drive shaft as will be apparent from a reading of the aforesaid '698 patent. Four roller bearings 34 are mounted for rolling contact on the cylindrical support beams 20 and 22 and are connected by means hereinafter described to the lower plate of the carriage 24 as shown. A stop plate 32 prevents the carriage from running off the ends of the beams 20 and 22.

Applicant's improved brush carriage is designated by the reference numeral 36 and includes some of the components of the '698 patent, as will be noted hereinafter. Carriage 36 includes a horizontally disposed lower plate 37 having a first end 38, a second end 40, a first side 42, a second side 44, a lower surface 46 and an upper surface 48. Lower plate 37 is positioned below the support arms 20 and 22. The numeral 50 refers to a horizontally disposed upper plate which is positioned above support arms 20 and 22 and which has a first end 52, a second end 54, a first side 56, a second side 58, a lower surface 60 and an upper surface 62. An upstanding first side plate 64 has its lower end secured to the lower plate 37 at the first side 42 by bolts 65 and has its upper end secured to upper plate 50 at the first side 56 thereof, as will be described hereinafter. An upstanding second side plate 66 has its lower end secured to the lower plate 37 at the second side 44 by bolts 67 and has its upper end secured to upper plate 50 at the second side 58 thereof, as will be described hereinafter.

A first upstanding end plate 68 has its lower end secured to lower plate 37 at the first end 58 thereof by bolts 69 and has its upper end secured to upper plate 50 at the first end 52 thereof, as will be described hereinafter. An upstanding second end plate 70 has its lower end secured to lower plate 37 at the second end 40 thereof by bolts 71 and has its upper end secured to upper plate 50 at the second end 54 thereof, as will be described hereinafter.

An elongated and horizontally disposed first cross-bar 72 is secured to the upper plate 50 at the first end 52 by bolts 73 thereof with the longitudinal axis of cross-bar 72 being transversely disposed with respect to the longitudinal axes of arms 20 and 22. Bolts 73 also secure end plate 68 to upper plate 50. An elongated and horizontally disposed first axle in the form of a bolt 74 has its inner end threadably secured to one end of the first cross-bar 72. A double-flanged roller 76 of the sealed bearing type is rotatably mounted on axle 74 and which is configured to roll upon support arm 22. An elongated and horizontally disposed second axle 78 in the form of a bolt has its inner end threadably secured to the other end of the first cross-bar 72. A double-flanged roller 80 is rotatably mounted on axle 78 and is configured to roll upon support arm 20.

An elongated and horizontally disposed second cross-bar 82 is secured to the upper plate 50 at the second end 54 by bolts 83 thereof with the longitudinal axis of cross-bar 82 being transversely disposed with respect to the longitudinal axes of support arms 20 and 22. Bolts 83 also secure end plate 70 to upper plate 50. An elongated and horizontally disposed third axle 84 in the form of a bolt has its inner end threadably secured to one end of the second cross-bar 82. A double-flanged roller 86 of the sealed bearing type is rotatably mounted on axle 84 and is configured to roll upon support arm 22. An elongated and horizontally disposed fourth axle 88 in the form of a bolt has its inner end threadably secured to the other end of the second cross-bar 82. A double-flanged roller 90 is rotatably mounted on axle 86 and is configured to roll upon support arm 20.

An elongated and horizontally disposed first support bar 92 is secured to the upper plate 50 at the first side 56 thereof by bolts 93. Bolts 93 also secure side plate 64 to upper plate 50. As seen, axle 74 extends through support bar 92, through roller 76 and into cross-bar 72. As also seen, axle 84 extends through support bar 92, through roller 86 and into cross-bar 82.

An elongated and horizontally disposed second support bar 94 is secured to the upper plate 50 at the second side 58 thereof by bolts 96. Bolts 96 also secure side plate 66 to upper plate 50. As seen, axle 78 extends through support bar 94, through roller 80 and into cross-bar 72. As also seen, axle 88 extends through support bar 94, through roller 90 and into cross-bar 82.

The brush carriage runs smoothly along the support beams 20 and 22 due to the engagement of the double-flanged rollers 76 and 86 with the support arm 22 and the engagement of the double-flanged rollers 80 and 90 with the support arm 20. The sealed bearings of the rollers 76, 80, 86 and 90 prevent water or other liquid chemicals from entering therein thereby ensuring longevity of the rollers.

Figure 5:
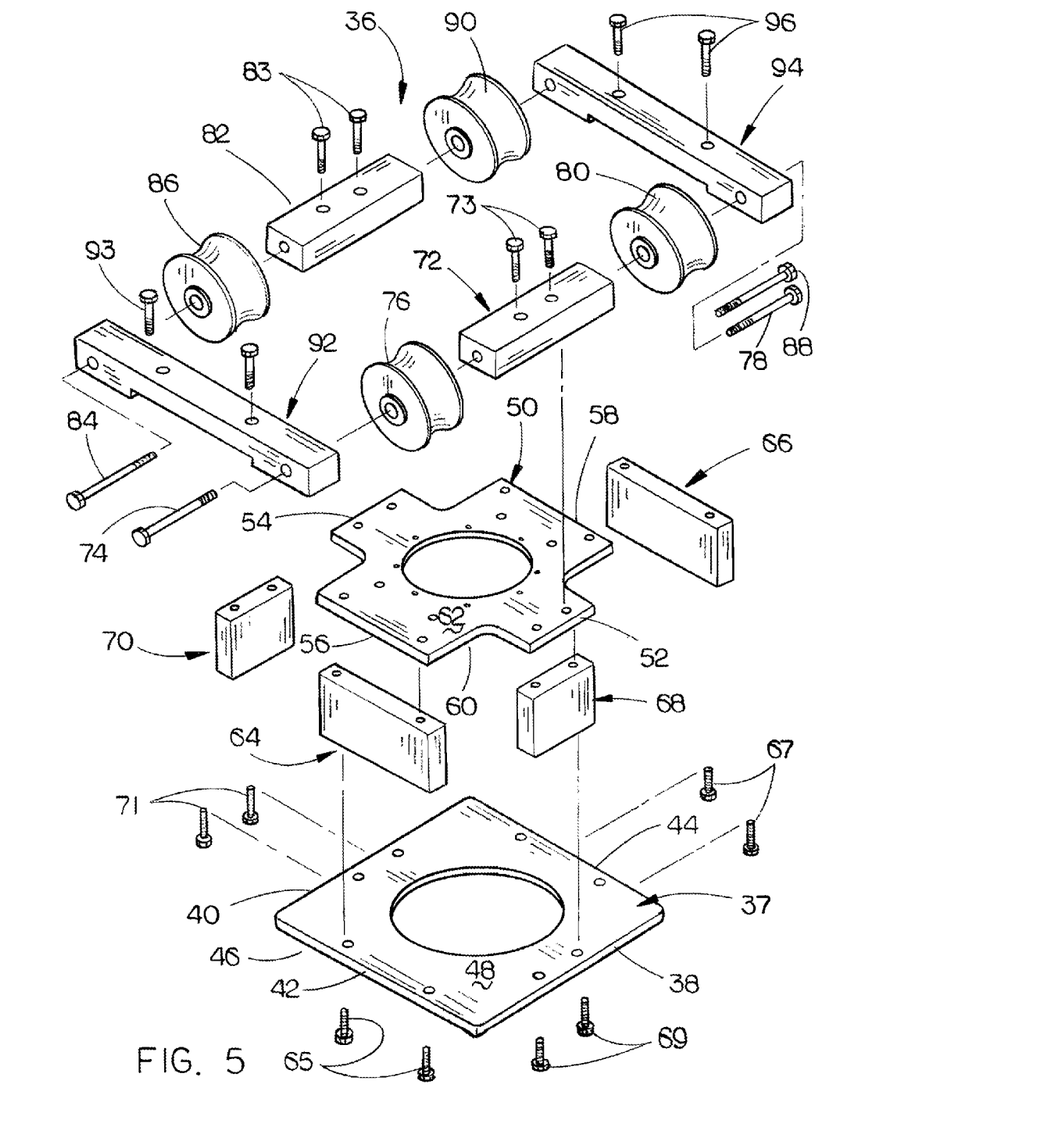
FIG. 5 is an exploded perspective view which illustrates the components of the conversion kit of this invention which are used to modify the carwash brush carriage of U.S. Pat. No. 7,752,698.
Figure 6:
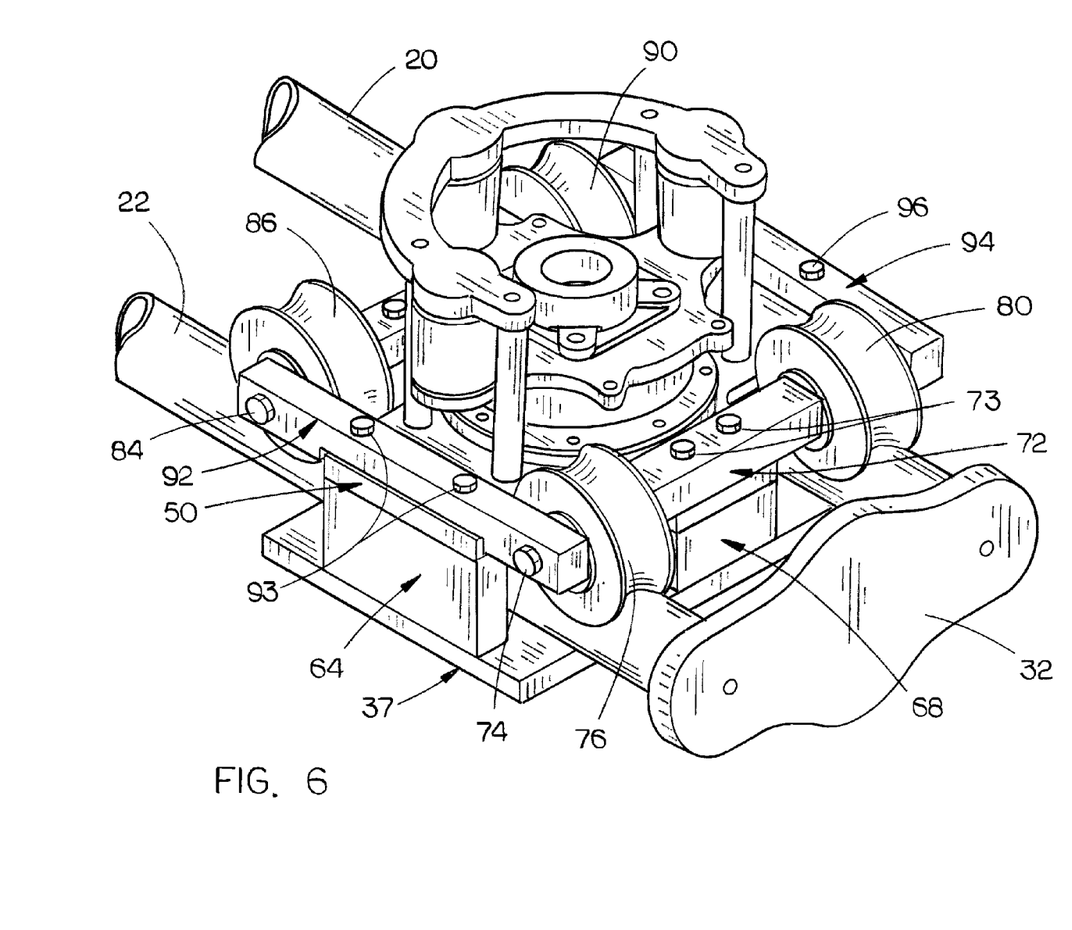
FIG. 6 is a perspective view illustrating the carwash brush assembly of U.S. Pat. No. 7,752,698 after it has been modified with the instant invention.
Figure 7:
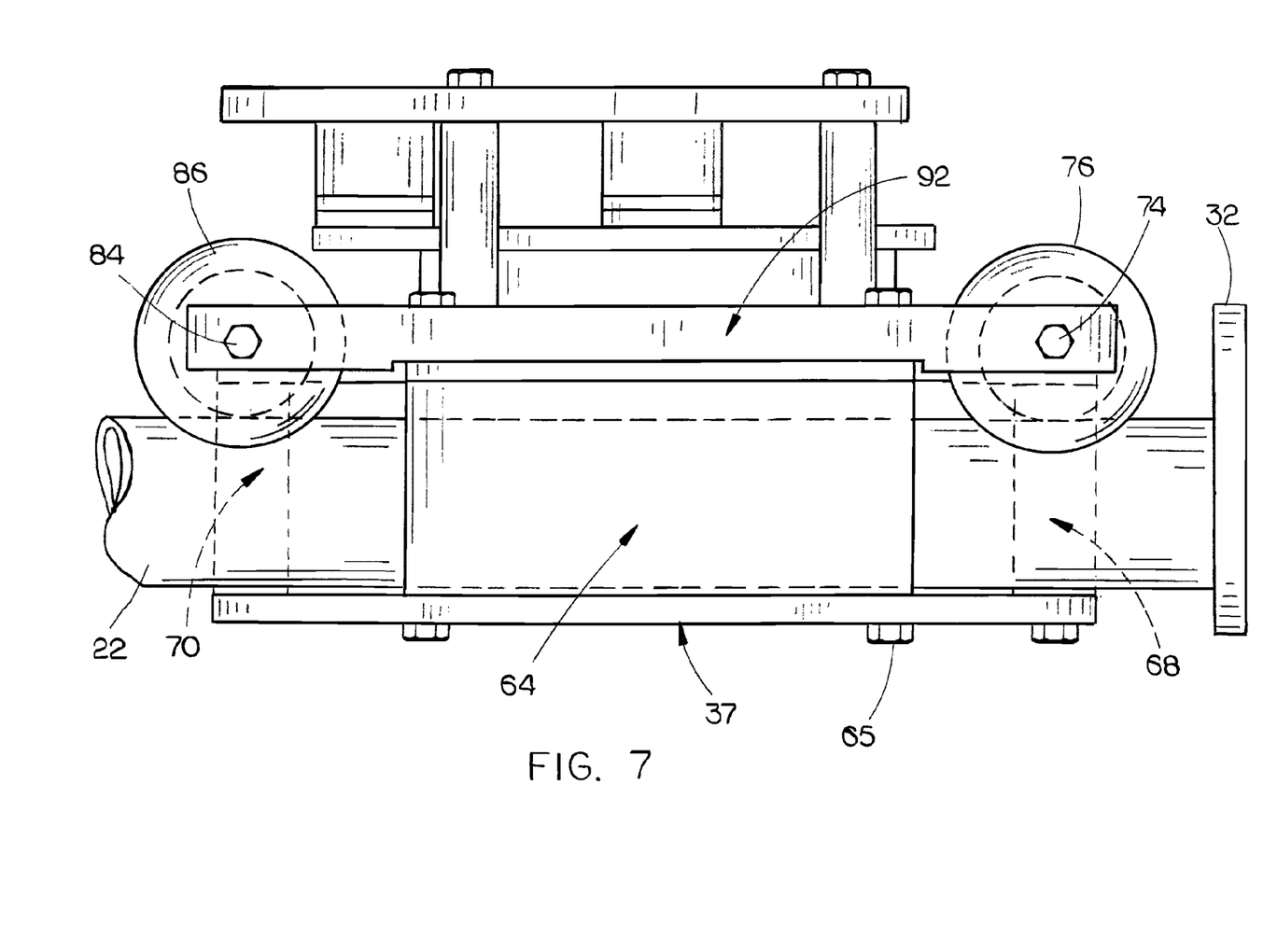
FIG. 7 is a side elevational view of the modified carwash brush assembly.
Figure 8:
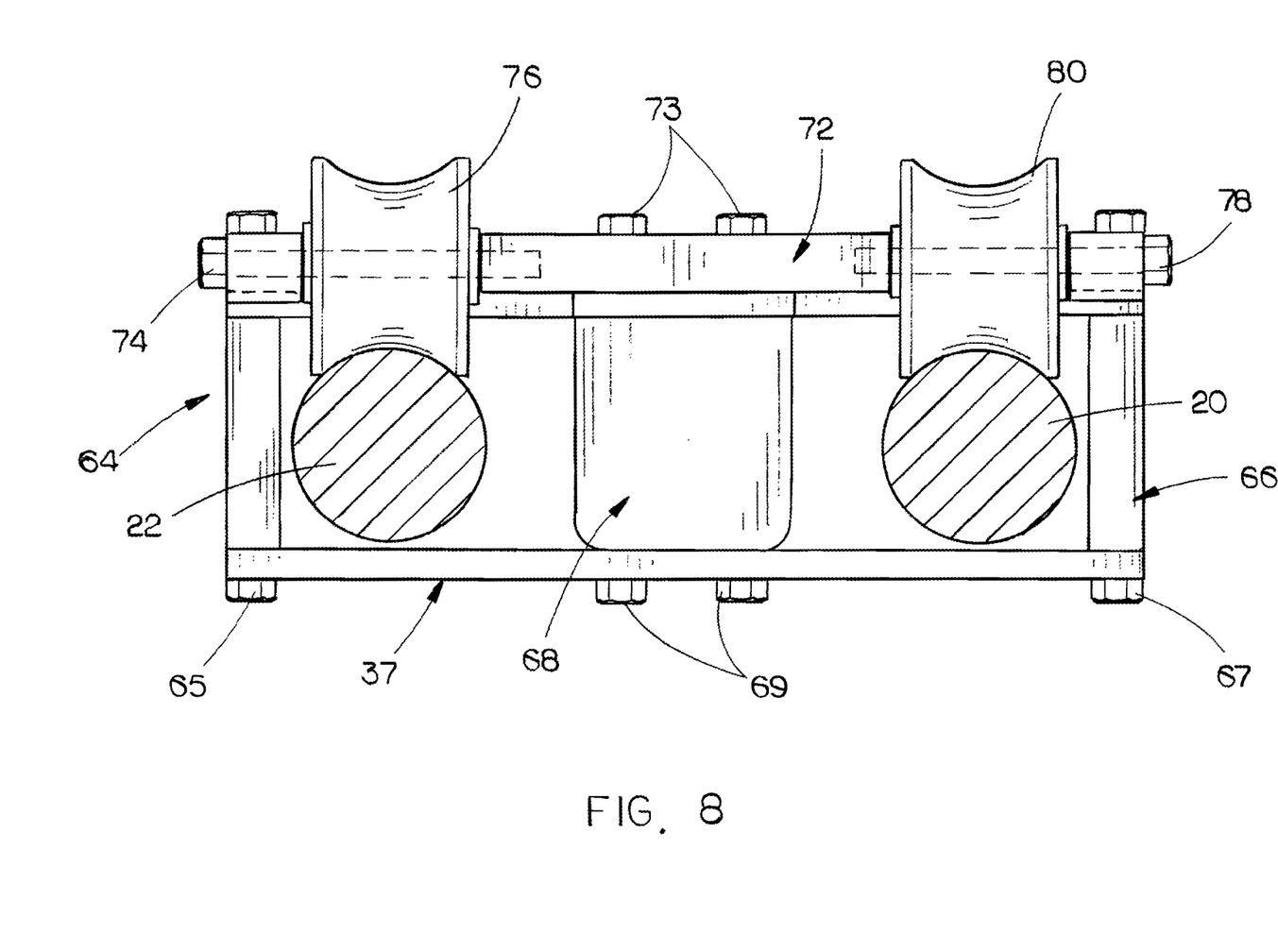
FIG. 8 is an end elevational view of the modified carwash brush assembly.

The improved rollers and their supporting structure may be marketed as a kit and which would include the following components:
 a. cross-bars 72 and 82;
 b. support bars 92 and 94;
 c. axles 74, 78, 84 and 88;
 d. rollers 76, 80, 86 and 90.

Further, the kit may include side plates 64 and 66 as well as end plates 68 and 70 if the existing brush carriage does not have those components.

The brush carriage of U.S. Pat. No. 7,752,698 may be easily modified to include the structure of the brush carriage of this invention. The modification is accomplished as follows: 1) the first, second, third and fourth rollers 34 are removed from the lower plate 24; 2) mounting first, second, third and fourth double-flange rollers to the upper plate 50 by way of the cross-bars 72, 74, support bars 92, 94, and axles 74, 78, 84, and 88. The modification may also be accomplished by way of mounting the side plates 64, 66 and the end plates 68, 70 if they are not a part of the brush carriage to be modified.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A carwash brush carriage for use with a carwash structure which includes an elongated and horizontally disposed first tubular support arm and an elongated and horizontally disposed second tubular support arm with the first and second tubular support arms being horizontally spaced-apart and parallel to one another, comprising:

said carwash brush carriage assembly being horizontally movably mounted on and supported by the first and second support arms;

said carwash brush carriage assembly including:
 a. a horizontally disposed lower plate positioned below the first and second support arms with said lower plate having a first end, a second end, a first side, a second side, a lower surface and an upper surface;
 b. a horizontally disposed upper plate positioned above the first and second support arms with said upper plate having a first end, a second end, a first side, a second side, a lower surface and an upper surface;
 c. a first upstanding side plate having a lower end, an upper end, a first end, a second end, an inner side, and an outer side;
 d. said first side plate having its said lower end secured to said lower plate at said first side of said lower plate and having its said upper end secured to said upper plate at said second side of said upper plate;
 e. a second upstanding side plate having a lower end, an upper end, a first end, a second end, an inner side, and an outer side;
 f. said second side plate having its said lower end secured to said lower plate at said second side of said lower plate and having its said upper end secured to said upper plate at said second side of said upper plate;
 g. a first upstanding end plate having a lower end, an upper end, a first side, a second side, an outer surface and an inner surface;
 h. said first end plate having its said lower end secured to said lower plate at said first end of said lower plate and having its said upper end secured to said upper plate at said first end of said upper plate;
 i. a second upstanding end plate having a lower end, an upper end, a first side, a second side, an outer surface and an inner surface;
 j. said second end plate having its said lower end secured to said lower plate at said second end of said lower plate and having its said upper end secured to said upper plate at said second end of said upper plate;
 k. an elongated and horizontally disposed first cross-bar having first and second ends;
 l. said first cross-bar being secured to said upper plate at said first end of said upper plate with the longitudinal axis thereof being transversely disposed with respect to the longitudinal axes of the first and second support arms;
 m. an elongated and horizontally disposed first axle, having inner and outer ends, with said inner end thereof being secured to said first end of said first cross-bar;
 n. a double-flanged first roller rotatably mounted on said first axle which is configured to roll upon the second support arm;
 o. an elongated and horizontally disposed second axle, having inner and outer ends, with said inner end thereof being secured to said second end of said first cross-bar;
 p. a double-flanged second roller rotatably mounted on said second axle which is configured to roll upon the first support arm;
 q. an elongated and horizontally extending second cross-bar having first and second ends;
 r. said second cross-bar being secured to said upper plate at said second end of said upper plate with the longitudinal axis thereof being transversely disposed with respect to the longitudinal axes of the first and second support arms;
 s. an elongated and horizontally disposed third axle, having inner and outer ends, with said inner end thereof being secured to said first end of said second cross-bar;
 t. a double-flanged third roller rotatably mounted on said third axle which is configured to roll upon the second support arm;
 u. an elongated and horizontally disposed fourth axle, having inner and outer ends, with said inner end thereof being secured to said second end of said second cross-bar;
 v. a double-flanged fourth roller rotatably mounted on said fourth axle which is configured to roll upon the first support arm;
 w. an elongated and horizontally extending first support bar having first and second ends;

x. said first support bar being secured to said upper plate at said first side thereof;
y. said second end of said first axle being secured to said first end of said first support bar;
z. said second end of said third axle being secured to said second end of said first support bar;
aa. an elongated and horizontally extending second support bar having first and second ends;
bb. said second support bar being secured to said upper plate at said second side thereof;
cc. said second end of said second axle being secured to said first end of said second support bar;
dd. said second end of said fourth axle being secured to said second end of said second support bar.

2. The structure of claim 1 wherein said first and second support arms are tubular.

3. The structure of claim 1 wherein said first, second, third and fourth double-flanged rollers are of the sealed bearing type.

\* \* \* \* \*